United States Patent
Lee

(10) Patent No.: US 9,027,152 B2
(45) Date of Patent: May 5, 2015

(54) DEVICE FOR RIGHT MANAGING WEB DATA, RECORDING MEDIUM FOR PERFORMING METHOD FOR RIGHT MANAGING WEB DATA ON COMPUTER, AND DEVICE AND METHOD FOR PROVIDING RIGHT MANAGEMENT INFORMATION

(75) Inventor: Hyung-Joo Lee, Seoul (KR)

(73) Assignee: Fasoo.com Co., Ltd, Seoul (KR)

( * ) Notice: Subject to any disclaimer, the term of this patent is extended or adjusted under 35 U.S.C. 154(b) by 111 days.

(21) Appl. No.: 13/810,868

(22) PCT Filed: Dec. 28, 2010

(86) PCT No.: PCT/KR2010/009438
§ 371 (c)(1),
(2), (4) Date: Feb. 7, 2013

(87) PCT Pub. No.: WO2012/015127
PCT Pub. Date: Feb. 2, 2012

(65) Prior Publication Data
US 2013/0298257 A1    Nov. 7, 2013

(30) Foreign Application Priority Data
Jul. 27, 2010  (KR) .................. 10-2010-0072378

(51) Int. Cl.
*H04L 29/06*     (2006.01)
*G06F 21/10*     (2013.01)

(52) U.S. Cl.
CPC ...................... *G06F 21/10* (2013.01)

(58) Field of Classification Search
CPC ..................................... G06F 21/10
USPC ......................................... 726/27
See application file for complete search history.

(56) References Cited

U.S. PATENT DOCUMENTS 5,917,912 A    6/1999   Ginter et al.
6,678,733 B1 *  1/2004   Brown et al. ............... 709/229
(Continued)

FOREIGN PATENT DOCUMENTS

JP    11296425 A    10/1999
JP    2001-325224 A    11/2001
(Continued)

OTHER PUBLICATIONS

JP 2001-325224, machine translation, Nov. 22, 2001, Kobayakawa Naoki.*

(Continued)

*Primary Examiner* — Yin-Chen Shaw
*Assistant Examiner* — John B King
(74) *Attorney, Agent, or Firm* — William Park & Associates Ltd.

(57) ABSTRACT

Disclosed are a device for right managing web data, a recording medium for performing a method for right managing web data on a computer, and a device and a method for providing right management information. In the device for right managing web data, a message processing unit adds agent information, which shows support for right management, to the header of a web data request message that is sent to a web server from a web browser, and sends same to the web server, parses and outputs the right information included in the header of a web data reply message that is sent to the web browser from the web server, and sends web data that is included in the web data reply message to the web browser. Also, a right managing unit controls the output of web data, which is included in the web data reply message, through a web browser based on the parsed right information which is input from the message processing unit.

7 Claims, 3 Drawing Sheets

(56) References Cited

U.S. PATENT DOCUMENTS

| | | | |
|---|---|---|---|
| 2002/0083178 A1* | 6/2002 | Brothers | 709/226 |
| 2002/0129168 A1* | 9/2002 | Kanai et al. | 709/247 |
| 2002/0162019 A1* | 10/2002 | Berry et al. | 713/201 |
| 2003/0046578 A1* | 3/2003 | Brown et al. | 713/200 |
| 2004/0083391 A1* | 4/2004 | De Jong | 713/201 |
| 2004/0133797 A1* | 7/2004 | Arnold | 713/200 |
| 2004/0168184 A1* | 8/2004 | Steenkamp et al. | 725/31 |
| 2005/0204148 A1* | 9/2005 | Mayo et al. | 713/185 |
| 2007/0067851 A1* | 3/2007 | Fernando et al. | 726/26 |
| 2007/0204161 A1* | 8/2007 | Isozaki et al. | 713/171 |
| 2008/0059448 A1 | 3/2008 | Chang et al. | |
| 2008/0066185 A1 | 3/2008 | Lester et al. | |
| 2008/0313334 A1* | 12/2008 | Willuns et al. | 709/227 |
| 2009/0293105 A1* | 11/2009 | Urakawa et al. | 726/4 |
| 2010/0095121 A1 | 4/2010 | Shetty et al. | |
| 2010/0262711 A1* | 10/2010 | Bouazizi | 709/231 |
| 2011/0269437 A1* | 11/2011 | Marusi et al. | 455/414.1 |

FOREIGN PATENT DOCUMENTS

| | | |
|---|---|---|
| KR | 1020050123503 A | 12/2005 |
| WO | 2008154428 A1 | 12/2008 |

OTHER PUBLICATIONS

"Hyptertext Transfer Protocol (HTTP/1.1): Message Syntax and Routing", RFC 7230, Jun. 2014, Originally published as RFC 2616 in Jun. 1999.*

"Hyptertext Transfer Protocol—HTTP/1.1", RFC 2616, Jun. 1999.*

* cited by examiner

DEVICE FOR RIGHT MANAGING WEB DATA, RECORDING MEDIUM FOR PERFORMING METHOD FOR RIGHT MANAGING WEB DATA ON COMPUTER, AND DEVICE AND METHOD FOR PROVIDING RIGHT MANAGEMENT INFORMATION

TECHNICAL FIELD

The present invention relates to a web data right management device, a recording medium for executing a web data right management method on a computer, and a device and method for providing right management information and, more particularly, to devices and a method that manage web data to be provided to a web browser based on a right set by a web server and that include right management information, associated with the web data to be sent to a client, in a message.

BACKGROUND ART

Major web browsers are developed based on web engines, and provide extension interfaces intended for the extension of functionality. Here, such a web engine has a standard interface regardless of whether it is open source, and the interface is generally maintained in order to support downward compatibility. Furthermore, an interface that is provided to develop extended functionality also has the characteristic of being generally and continuously maintained in order to maintain downward compatibility. If a technology for controlling a web browser is developed using the characteristic of an interface being maintained as described above, there are the advantage of applying the same or similar control patterns to heterogeneous browsers developed using the same web engine, and the advantage of maintenance being relatively easy because there is a strong possibility of an interface being maintained even when a browser is upgraded.

Although various standards have been developed for the control of access to data present on the web and encryption in a network section and thus support has been provided regardless of the browser and the OS, right management associated with information sent to a client has not been standardized in connection with computer programming. Accordingly, the current management of rights to web data is commonly performed by applying a standard web specification or browser extension functionality.

First, examples of controlling the conversion of web information sent to a client using the web standard specification, such as scripts and cookies, include the blocking of the dragging of a mouse and the blocking of keyboard input. This scheme is not browser and OS-dependent, and can easily identify a protection target because the operating range of a script is the same as the range of the protection target. Furthermore, this scheme has the advantage of requiring no additional functionality in a web server. However, this scheme does not work when a browser does not support scripts or when the script operation is blocked, and the protection targets of this scheme are limited to HTML data to which the script operation can be applied. Furthermore, this scheme has the disadvantage of, if a script part is removed from transmitted information, allowing information to be easily extracted because the control operation is performed after all information has been sent, and the disadvantage of being helpless against the extraction of information via another extension present in a browser.

Meanwhile, the right management scheme using a browser extension is a method that invokes a browser extension in HTML and controls the functionality of a browser in the invoked browser extension. This scheme has the advantage of relatively easily identifying a protection target in that it is sufficient if only an invoked part is protected, and the advantage of requiring no additional functionality in a web server. In contrast, this scheme has the problem of having to be developed for each browser and each OS because it is browser and OS-dependent, and the problem of being unable to operate in a browser that does not provide browser extension functionality. In order to compensate for these problems, techniques, such as scripts and cookies, should be additionally employed, the shortcomings of which have been already described above.

The conventional web information protection schemes are focused on the protection of each file physically present on the web, and information that can be protected by the schemes is limited to information that can be programmed. That is, the conventional schemes limitedly offer protection to files having their own DRM format such as DRM Content Format (DCF), or to objects involving the control operation of JavaScript such as an HTML object. There is a need for a scheme that is capable of supporting right management at a protocol level in order to protect the rights of data objects that cannot be supported by the conventional schemes and that are generated in a fixed format or dynamically, such as images.

DISCLOSURE

Technical Problem

A technical object of the present invention is to provide a web data right management device that is capable of processing right information associated with data to be sent from a data web server to a client at a protocol level, and a recording medium that is capable of executing a web data right management method on a computer.

Another technical object of the present invention is to provide a device and method for providing right management information that are capable of setting right information for web data without changing the basic functionality of a web server that provides web data.

Technical Solution

In order to accomplish the above-described one object, the present invention provides a web data right management device, including a message processing unit configured to add agent information, indicative of whether the management of a right to web data is supported, to the header of a web data request message to be sent from a web browser to a web server and transfer the web data request message to the web server, to parse and output right information included in the header of a web data reply message to be sent from the web server to the web browser, and to transfer the web data included in the web data reply message to the web browser; and a right managing unit configured to control the output of the web data, included in the web data reply message, via the web browser based on the content of the parsed right information input from the message processing unit.

In order to accomplish the above-described one object, the present invention provides a computer-readable recording medium storing a program for executing a web data right management method on a computer, the web data right management method including the steps of (a) adding agent information, indicative of whether the management of a right to web data is supported, to the header of a web data request message to be sent from a web browser to a web server, and transferring the web data request message to the web server; (b) parsing and outputting right information included in the header of a web data reply message to be sent from the web server to the web browser; (c) controlling output of web data, included in the web data reply message, via the web browser based on the content of the parsed right information; and (d) if it is determined at step (c) that the web data will be output, transferring the web data included in the web data reply message to the web browser.

In order to accomplish the above-described other object, the present invention provides a device for providing right management information, including a browser determination unit configured to determine whether a web browser can be provided with web data based on agent information, indicative of whether a right managing agent that manages a right to web data to be sent from a web server to the web browser supports the management of a right to the web data, included in the header of a web data request message to be transferred from the right managing agent to the web server, and based on URI information included in the web data request message; and a message transfer unit configured to, if it is determined that the web browser can be provided with the web data, transfer the web data request message to the web server, add right information, set for the web data, to the header of a web data reply message to be sent from the web server to the web browser, and transfer the web data reply message to the right managing agent.

In order to accomplish the above-described other object, the present invention provides a method of providing right management information, including the steps of (a) determining whether a web browser can be provided with web data based on agent information, indicative of whether a right managing agent that manages a right to web data to be sent from a web server to the web browser supports the management of a right to the web data, included in the header of a web data request message to be transferred from the right managing agent to the web server, and based on URI information included in the web data request message; and (b) if it is determined that the web browser can be provided with the web data, transferring the web data request message to the web server, adding right information, set for the web data, to the header of a web data reply message to be sent from the web server to the web browser, and transferring the web data reply message to the right managing agent.

Advantageous Effects

In the web data right management device, the recording medium for executing a web data right management method on a computer, and a device and method for providing right management information in accordance with the present invention, it is possible to include right management information associated with web data in a message and also control the output of the web data based on the content of the right information without changing the functionality of a web browser requesting the web data and the functionality of a web server providing the web data.

MODE FOR INVENTION

Preferred embodiments of a web data right management device, a recording medium for executing a web data right management method on a computer, and a device and method for providing right management information in accordance with the present invention will be described in detail with reference to the accompanying drawings.

Figure 1:
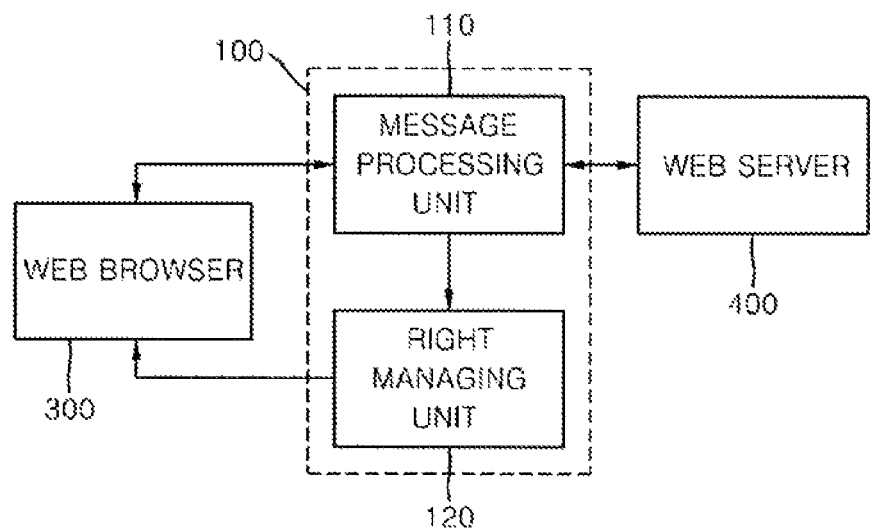
FIG. 1 is a block diagram illustrating the configuration of a preferred embodiment of a web data right management device in accordance with the present invention.

FIG. 1 is a block diagram illustrating the configuration of a preferred embodiment of a web data right management device in accordance with the present invention.

Referring to FIG. 1, a web data right management device 100 in accordance with the present invention includes a message processing unit 110 and a right managing unit 120, and may be implemented in a client terminal, along with a web browser 300 that receives web data from a web server 400 and displays the web data. Furthermore, the web data right management device 100 in accordance with the present invention functions as a right managing agent between the web browser 300 and the web server 400, and is provided in the form of a browser extension and thus operates inside the process of the web browser 300. Furthermore, the web data right management device 100 in accordance with the present invention is executed as part of the operation of the web browser 300.

The message processing unit 110 adds agent information, indicative of whether the web data right management device 100 in accordance with the present invention supports the management of a right to web data, to the header of a web data request message to be sent from the web browser 300 to the web server 400, and then sends the web data request message to the web server 400. Furthermore, the message processing unit 110 parses and outputs right information included in the header of a web data reply message sent from the web server 400 to the web browser 300, and transfers web data included in the web data reply message to the web browser 300.

In a conventional right management scheme, the web browser 300 directly includes information, indicative of whether it supports right management, in a web data request message, and then sends the web data request message. Accordingly, a control specification version that can be currently supported by the web browser 300 and the identification information of the web browser 300 itself are required. In contrast, in accordance with the web data right management device 100 of the present invention, the web browser 300 generates a web data request message for requesting the provision of web data and sends the web data request message to the web server 400, and the message processing unit 110 adds agent information to the header of the web data request message in the middle of transmission and then transfers the web data request message to the web server 400. As a result, it is possible to perform the management of a right to web data without adding new functionality to the web browser 300.

Meanwhile, in the section of the web, when security is not applied, all information is exposed, and the information may be forged or altered. Accordingly, it is necessary to apply a data protection technique to the section of the web, which may be achieved by a common data section protection method such as Secure Sockets Layer (SSL).

The web data reply message in which the web data requested by the web browser 300 is included is sent from the web server 400, and the message processing unit 110 transfers the web data reply message to the web browser 300. In this case, the right information included in the header of the web data reply message is parsed and sent to the right managing unit 120. The right information of the web data includes information about a right to provide the web data, information about a right to read the web data, and information about a right to print the web data output through the web browser 300, which are limited to the web browser 300 having a specific IP address.

The right managing unit 120 controls the output of the web data, included in the web data reply message, via the web browser 300 based on the content of the parsed right information. That is, whether to output the web data included in the web data reply message to be sent from the message processing unit 110 to the web browser 300 via the web browser 300 is determined under the control of the right managing unit 120. For example, if the content of the right information relates to the provision of the web data limited to the web browser 300 having a specific IP address and if the web browser 300 that has currently sent the web data request message does not correspond to the IP address of a target for the provision of the web data, the right managing unit 120 prevents the web data, included in the web data reply message transferred by the message processing unit 110, from being output via the corresponding web browser 300.

Meanwhile, there may be cases in which web data cannot be provided to the web browser 300, other than the case in which whether to output web data is determined based on right information included in a web data reply message. For example, there is a case in which it is determined that the web data right management device 100 in accordance with the present invention does not support right management by the message processing unit 110 based on the agent information added to the header of the web data request message or in which the web server 400 cannot provide web data corresponding to URI information requested by the web browser 300. The determination of whether such web data can be provided is performed on the web server 400 side. If the web data cannot be provided, a reply message including an error code related to the rejection of a request is sent from the web server 400. The message processing unit 110 notifies the web browser 300 that the web data cannot be provided by transferring the reply message to the web browser 300.

In response to the fact that the web data right management device 100 in accordance with the present invention is provided in the client terminal along with the web browser 300 and performs the management of a right to web data without adding new functionality to the web browser 300, an apparatus 200 for providing right management information in accordance with the present invention functions to determine whether web data can be provided by the web server 400 side and to include right information in a web data reply message.

Figure 2:
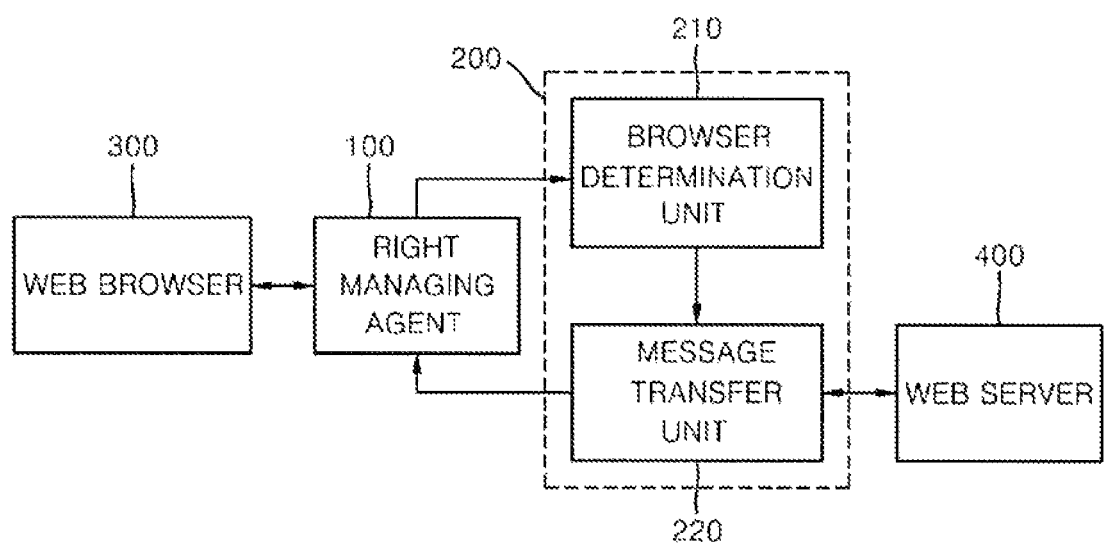
FIG. 2 is a block diagram illustrating the configuration of a preferred embodiment of a device for providing right management information in accordance with the present invention.

FIG. 2 is a block diagram illustrating the configuration of a preferred embodiment of the apparatus 200 for providing right management information in accordance with the present invention.

Referring to FIG. 2, the apparatus 200 for providing right management information in accordance with the present invention includes a browser determination unit 210 and a message transfer unit 220. Furthermore, the apparatus 200 for providing right management information in accordance with the present invention may be implemented in the web server 400 or in a separate device, and perform message transfer functionality between a web data right management device 100 in accordance with the present invention and a web server 400.

The browser determination unit 210 determines whether the web browser 300 can be provided with web data based on agent information, indicative of whether the right managing agent 100 supports the management of a right to web data, included in the header of a web data request message that is transferred to the web server 400 from the right managing agent 100 for performing the management of a right to web data to be sent from the web server 400 to the web browser 300, and based on URI information included in the web data request message.

Here, the right managing agent 100 is a device that performs the same functionality as the above-described web data right management device 100 in accordance with the present invention. In the following description, not only the functionalities of a message processing unit 110 and a right managing unit 120 included in the right managing agent 100, that is, a web data right management device 100, but also the functionalities of the components of the apparatus 200 for providing right management information in accordance with the present invention will be described.

The fact that if it is determined that the web data right management device 100 in accordance with the present invention does not support right management or if the web server 400 cannot provide web data corresponding to URI information requested by the web browser 300, a reply message including an error code related to the rejection of a request is sent from the web server 400 has been already described. Here, the functionality of determining whether web data can be provided to the web browser 300 is determined by the browser determination unit 210. The results of the determination of the browser determination unit 210 are input to the input message transfer unit 220.

If, as a result of the determination of the browser determination unit 210, web data cannot be provided to the web browser 300, the message transfer unit 220 sends a reply message including an error code related to the rejection of a request to the message processing unit 110, as described above. Furthermore, if it is determined that the web browser 300 can be provided with the web data, a web data request message is transferred to the web server 400, right information set for the web data is added to the header of a web data reply message to be transferred from the web server 400 to the web browser 300, and then the web data reply message is transferred to the message processing unit 110 of the right managing agent 100.

Figure 3:
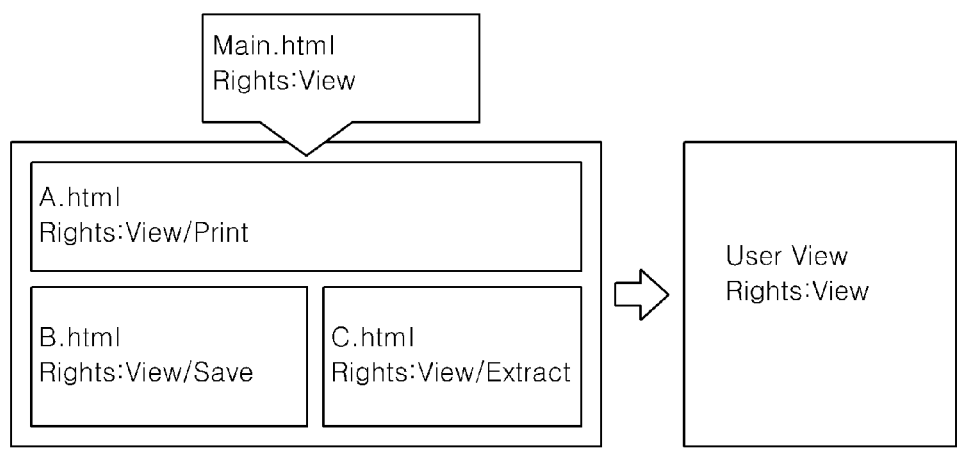
FIG. 3 is a diagram illustrating an example of rights processing in the case in which web data is divided into three frames.

The right information included in the web data reply message is applied to the highest element of the web data in the form of a logical AND operation. FIG. 3 is a diagram illustrating an example of rights processing in the case in which web data is divided into three frames. Referring to FIG. 3, it can be seen that single main HTML data is divided into three pieces of HTML data A to C and a right set in common for the pieces of HTML data is a right to view. Accordingly, right information set for web data to be output via the web browser 300 includes only the right to view based on a logical AND operation.

The web data sent to the web browser 300 is processed again into a form that can be used in the web browser 300, and the processed information is provided to a component that is responsible for each piece of functionality. Since the web browser 300 should be in a form that can be finally used by a user in terms of a utilization model, the operation of the web browser 300 is initiated by the user, with the exceptions of modules in charge of monitoring and filtering. Here, the core engine part of the web browser 300 provides information currently associated with the user operation to a component that requests information.

Here, the component is a code execution unit that is dynamically generated and resides in memory, and may be a part that is responsible for the functionality of the web browser 300 or that belongs to an extension functionality, or a component configured such that a script included in HTML is processed by a script engine and then operates. The component is divided into a data area and an execution area. The data area is an area in which sent information is stored, and has a tree-type data structure in the case of the HTTP. Furthermore, right information should be included therein or mapped thereto. The execution area is a part that operates using sent information, and corresponds to an area in which rights control is executed, so that the execution is allowed or blocked depending on the right information included in or mapped to the data area.

Thereafter, a rights control method based on the type of web browser 300 will now be described. The structure of the web browser 300 may be divided into basic control, network communication, web control and data application from the point of view of rights control. Of these, only the web control part corresponds to an object that is assigned to a URL in subordination thereto.

First, in the case in which the web browser 300 is Internet Explorer (IE), IE uses an MSHtml (Trident) web engine using a COM technology after the release of version 3, and each object can check a structure using the interface definition language IDL. Control may be performed using virtual function table hook using IDL information, object wrapping using inheritance, and dummy object processing using the same interface.

The network communication part is an object that supports IInternetProtocolRoot and an extension interface of a corresponding interface, and is configured to be reused through worker threads and object pulling. The part of the network communication part that processes HTTP(S) is an object that is generated by a corresponding interface object, and has specifications that support IHttpNegotiate and its extension interface. The request part of this part sends the information of the rights control module, and the response part thereof analyzes right information and performs mapping to the data processing unit.

The web control part is a URL-dependent part, and provides an IWebBrowser2 interface. This part may be viewed as being actually responsible for the functionality of the web browser in that it processes control and information related to a web screen and is responsible for information and processing related to Html and script. The web control part is a part that substantially controls rights, and performs right-based operation blocking/allowance. For the data application part, the functionality of blocking the leakage of data is implemented. Main control targets include UI control over an IDocHostUIHandler support object, Ole control over an IOleCommandTarget support object, and data mobility control over IHTMLDocument and its extension support object.

Furthermore, in the case of the Mozilla Firefox web browser 300, Firefox 3.x employs Gecko that is an open source web engine, and may use virtual class and registration functionality that is provided by Gecko. Using this structure, control can be performed through event listening and the assignment of attributes to each object.

Firefox has a structure using nsIObserver as its basic structure. Furthermore, Firefox performs a lower object-based control based on nsIDOMEventListener, nsIController, nsIDOMMouseListener, nsIDOMKeyListener, nsIDOMXULListener, nsIDOMMouseMotionListener, and an interface.

The network communication part performs filtering using information transferred via nsIObserver, and maps the track location of information using an nsISupport object provided as a function argument. Furthermore, the web control part uses an Event listener, and additionally uses a subclassing technique. There is provided a structure that checks object information transferred via an event callback and allows or blocks the information of a required object. Main control objects are nsIDOMDocument objects, and are configured to perform control from corresponding objects to lower objects, such as nsIPIDOMWindow, when needed.

Figure 4:
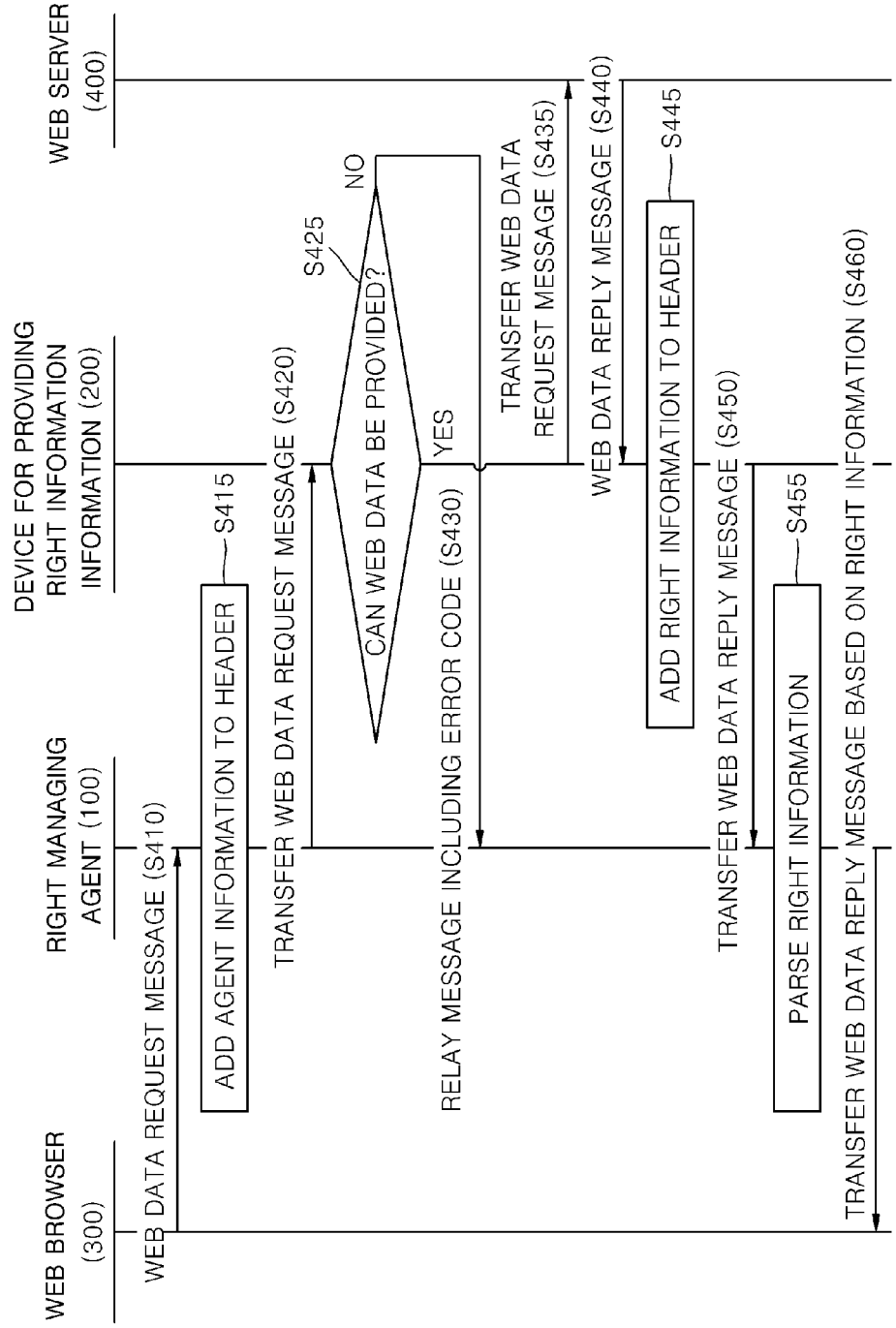
FIG. 4 is a flowchart illustrating the performance of a preferred embodiment in which a right to web data is managed by the web data right management device and the device for providing right management information in accordance with the present invention.

FIG. 4 is a flowchart illustrating the performance of a preferred embodiment in which a right to web data is managed by the web data right management device 100 and the apparatus 200 for providing right management information in accordance with the present invention.

Referring to FIG. 4, when a web data request message is sent from the web browser 300 to the web server 400 at step S410, the message processing unit 110 of the web data right management device 100 in accordance with the present invention adds agent information, indicative of whether the management of a right to web data is supported, to the header of the web data request message at step S415 and transfers the web data request message to the web server 400 at step S420.

The browser determination unit 210 of the apparatus 200 for providing right management information in accordance with the present invention determines whether the web browser 300 can be provided with the web data based on the agent information, indicative of whether the data right management device 100 supports the management of a right to the web data, included in the header of the web data request message that is transferred from the message processing unit 110 to the web server 400 and based on URI information web data request message at step S425. If, as a result of the determination, it is determined that the web browser 300 cannot be provided with the web data, the message transfer unit 220 transfers a reply message including an error code related to the rejection of the request to the message processing unit 110 at step S430. Furthermore, if it is determined that the web browser 300 can be provided with the web data, the message transfer unit 220 transfers the web data request message to the web server 400 at step S435.

Once the web data reply message in which the web data is included has been sent from the web server 400 at step S440, the message transfer unit 220 adds right information set for the web data to the header of the web data reply message at step S445, and transfers the web data reply message to the message processing unit 110 at step S450.

The message processing unit 110 parses the right information included in the header of the web data reply message at step S455, and the right managing unit 120 receives the web data reply message, and controls the output of the web data, included in the web data reply message, via the web browser 300, that is, it determines whether to output the web data included in the web data reply message that is transferred from the message processing unit 110 to the web browser 300 at step S460.

In an actually implemented form, the web data right management device 100 in accordance with the present invention is installed in the form of a toolbar-type agent operating inside the web browser 300 and an external exe/service performing capture control on the basis of the Windows Operating System (OS), and is provided in a setup form. Furthermore, the apparatus 200 for providing right management information in accordance with the present invention may be provided with a Servlet filter and a .NETASP filter in order to be used on the web server, or may be provided in the form of a separate Software Development Kit (SDK) in order to perform programming without using filters.

The present invention may be implemented as computer-readable code stored in a computer-readable storage medium. The computer-readable storage medium includes all types of storage devices in which computer system-readable data is stored. Examples of the computer-readable storage medium are Read Only Memory (ROM), Random Access Memory (RAM), Compact Disk-Read Only Memory (CD-ROM), magnetic tape, a floppy disk, and an optical data storage device. Furthermore, the computer-readable storage medium may be implemented as carrier waves (for example, in the case of transmission over the Internet). Moreover, the computer-readable medium may be distributed across computer systems connected via a network, so that computer-readable code can be stored and executed in a distributed manner.

Although the preferred embodiments of the present invention have been illustrated and described, the present invention is not limited to the above-described specific preferred embodiments, and those having ordinary knowledge in the technical field to which the present invention pertains can make various modifications and variations without departing from the gist of the present invention that is claimed in the attached claims. Such modifications and variations fall within the scope of the claims.

The invention claimed is:

1. A web data right management device, the device comprising:
   a hardware processor;
   a message processing logic that adds agent information, indicative of whether management of a right to web data is supported, to a header of a web data request message to be sent from a web browser to a web server and transfer the web data request message to the web server, to parse and output right information included in a header of a web data reply message to be sent from the web server to the web browser, and to transfer the web data included in the web data reply message to the web browser; and
   a right managing logic that controls output of the web data, included in the web data reply message, via the web browser based on content of the parsed right information input from the message processing logic,
   wherein the message processing logic transfers a reply message, including an error code related to rejection of a request sent from the web server because of no support of the right management determined based on the agent information, to the web browser, and
   wherein the web data right management device is located on a client terminal in which the web browser is installed,
   wherein the web data is to be output to the web browser to allow user action to be performed on the web data based on content of the parsed right information, with respect to an action message input via the web browser in response to the web data.

2. The web data right management device of claim 1, wherein the message processing unit transfers a reply message, including an error code related to rejection of a request sent from the web server because of an error in URI information included in the web data request message, to the web browser.

3. A non-transitory computer-readable recording medium storing a program for executing a web data right management method on a client terminal in which a web browser is installed, the web data right management method comprising the steps of:
   (a) adding agent information, indicative of whether management of a right to web data is supported, to a header of a web data request message to be sent from the web browser to a web server, and transferring the web data request message to the web server;
   (b) parsing and outputting right information included in a header of a web data reply message to be sent from the web server to the web browser;
   (c) controlling output of web data, included in the web data reply message, via the web browser based on content of the parsed right information; and
   (d) if it is determined at step (c) that the web data will be output, transferring the web data included in the web data reply message to the web browser,
   wherein the web data right management method further comprising,
   (e) transferring a reply message, including an error code related to rejection of a request sent from the web server because of no support of the right management determined based on the agent information, to the web browser,
   wherein the web data is to be output to the web browser to allow user action to be performed on the web data based on content of the parsed right information, with respect to an action message input via the web browser in response to the web data.

4. The non-transitory computer-readable recording medium of claim 3, wherein step (d) comprises transferring a reply message, including an error code related to rejection of a request sent from the web server because of an error in URI information included in the web data request message, to the web browser.

5. A device for providing right management information, the device comprising:
   a hardware processor;
   a browser determination logic, executable by a processor, that determines whether a web browser can be provided with web data based on agent information, indicative of whether a right managing agent that manages a right to web data to be sent from a web server to the web browser supports management of a right to the web data, included in a header of a web data request message to be transferred from the right managing agent to the web server, and based on Uniform Resource Identifier (URI) information included in the web data request message; and
   a message transfer logic that, if it is determined that the web browser can be provided with the web data, transfers the web data request message to the web server, add right information, set for the web data, to a header of a web data reply message to be sent from the web server to the web browser, and transfer the web data reply message to the right managing agent,
   wherein the message transfer logic that, if it is determined that the web browser cannot be provided with the web data, sends a reply message, including an error code related to rejection of a request because of no support of the right management determined based on the agent information, to the right managing agent, and wherein the device for providing right management information is located on the web server, wherein the web data is to be output to the web browser to allow user action to be performed on the web data based on content of the parsed right information, with respect to an action message input via the web browser in response to the web data.

6. A method of providing right management information, the method being executed on a web server and comprising the steps of:
(a) determining whether a web browser can be provided with web data based on agent information, indicative of whether a right managing agent that manages a right to web data to be sent from the web server to the web browser supports management of a right to the web data, included in a header of a web data request message to be transferred from the right managing agent to the web server, and based on Uniform Resource Identifier (URI) information included in the web data request message; and
(b) if it is determined that the web browser can be provided with the web data, transferring the web data request message to the web server, adding right information, set for the web data, to a header of a web data reply message to be sent from the web server to the web browser, and transferring the web data reply message to the right managing agent, wherein step (b) comprised, if it is determined that the web browser cannot be provided with the web data, sending a reply message, including an error code related to rejection of a request because of no support of the right management determined based on the agent information, to the right managing agent, wherein the web data is to be output to the web browser to allow user action to be performed on the web data based on content of the parsed right information, with respect to an action message input via the web browser in response to the web data.

7. A non-transitory computer-readable recording medium storing a program for executing a web data right management method on a computer, the web data right management method being set forth in claim 6.

* * * * *